Nov. 17, 1931.  T. A. STEVENS  1,832,591

STOPPER OR CLOSURE

Filed July 29, 1929

Thomas A. Stevens
INVENTOR.

By C.A.Snow&Co.

ATTORNEYS.

Patented Nov. 17, 1931

1,832,591

UNITED STATES PATENT OFFICE

THOMAS ARTHUR STEVENS, OF WOLVERHAMPTON, ENGLAND

STOPPER OR CLOSURE

Application filed July 29, 1929, Serial No. 381,867, and in Great Britain October 18, 1928.

This invention comprises certain improvements in or relating to stoppers or closures, and particularly relates to an anti-splash device for filler caps for petrol, oil or like tanks or containers. The present invention has for its object to provide an anti-splash device which will prevent leakage to the outside of the cap through vent holes.

According to the present improvements, a sealing member is provided inside the cap, such sealing member having a hollow portion to form an interior chamber into which escaping petrol or the like must first enter, through the necessary air vent hole. The sealing member is formed of two plates and the arrangement is such that petrol which leaks between the plates will be directed back to the tank. The sealing member is fitted inside an annular recess in the cap, thereby preventing the sealing member dropping out of the cap.

Reference is had to the accompanying drawings on which:—

Figure 1:
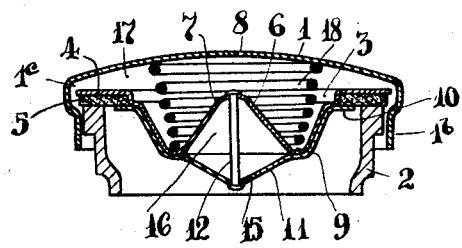
Figure 2:
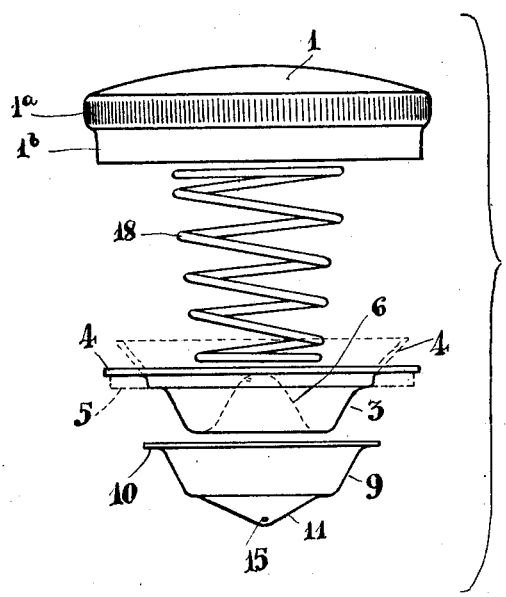

Figure 1 is a central cross-sectional view of a stopper or closure device constructed according to this invention, and Figure 2 is a side view of the separated component parts of the device.

According to a convenient embodiment of the invention as applied to a filler cap for motor-cycle, automobile or like petrol, oil for other tanks, the cap has a dome shaped top 1 and the rim 1a thereof is knurled for gripping purposes. The rim 1b below this knurled part is of reduced diameter and is screw threaded or otherwise adapted for fitting to a correspondingly screw threaded or shaped neck 2 on the tank. The sealing member comprises two cup-shaped plates 3 and 9 to form an inner chamber 16. The plate 3 has an annular rim 4 for receiving the leather or like sealing ring 5, and has a conical or like raised portion 6. An air vent hole 7 is formed at or near the centre or apex of the pressing 3, or any other suitable position, said air vent being preferably out of register with a vent hole 8 formed in the dome of the cap 1. The plate 9 is fixed to the underside of the plate 3 and the rim 10 of the plate 9 fits against the underside of the sealing ring 5 so that such ring is clamped between the rim 4 and the rim 10. The cup shaped plate 9 has a recess portion 11 which fits opposite the raised portion 6 in the pressing 3 and is secured thereto such as by means of a rivet 12. An air vent hole 15 is formed near the centre of the plate 9. As shown in Figure 2 the flange 4 of the plate 3 is conical before the sealing member is fitted into the cap. This flange 4 is flattened out to engage the annular recess 1c in the cap, thereby preventing the sealing member falling out of the cap. It will thus be seen that a chamber 16 is formed between the two pressings 3 and 9 and a chamber 17 is also formed between the first mentioned or top pressing 3 and the underside of the cap 1, so that any petrol or the like which is splashed through the lower vent hole 15 into the chamber 16 between the two pressings, will not be able to escape through the vent 7 in the top of the chamber, but will either flow back through the lower vent hole 15 or creep up the joint between the two pressings 3 and 9 and then back into the tank. The gas pressure in the chamber 16 between the two plates is, in relation to the gas pressure in the chamber 17, such that any petrol or liquid which reaches the inside of said chamber 16 will not be assisted to escape through the air vent hole 7 formed in the top of the chamber.

The invention is shown applied to the filler cap as set forth in patent application No. 376,308, in which the filler cap 1 is secured to the neck 2 of the tank by means of a wedge or cam action. In this case a compression spring 18 is fitted between the top pressing 3 and the underside of the cap 1, but is not needed when a screw threaded cap is used.

Claims:

1. A stopper or closure comprising a cap, a sealing member which is clamped between the cap and the neck of the container and which is formed of two plates constructed to form a chamber between the two plates and a chamber between the sealing member and the top of the cap, a sealing washer fixed between the two plates with the edge of the lower plate lying within the neck of the container, and a rivet securing the two plates together.

2. A stopper or closure comprising a cap, a sealing member, which is clamped between the cap and the neck of the container, formed of an upper plate having a cup-shaped recess in the centre, and a lower plate of smaller diameter having a cup-shaped recess in the centre in which the cup-shaped centre of the upper plate rests, and the bottom of both cup-shaped recesses having reversed depressions to form a chamber between the two plates, a sealing washer held between flanges on the two plates with the edge of the lower plate lying within the neck of the container, and a central rivet connecting the two plates together.

3. A stopper or closure comprising a cap, having an internal annular groove therein, a sealing member, which is adapted to be clamped between the cap and the neck of the container, formed of two plates constructed to form a chamber between the two plates and a chamber between the sealing member and the top of the cap, a sealing washer fixed at the edge of the sealing member, a flange on the upper of said plates which is formed conical before being placed in the cap and which is flattened to expand into engagement with the said annular groove in the cap.

In witness whereof I have signed this specification at Birmingham, England.

THOMAS ARTHUR STEVENS.